Figures 1, 3:
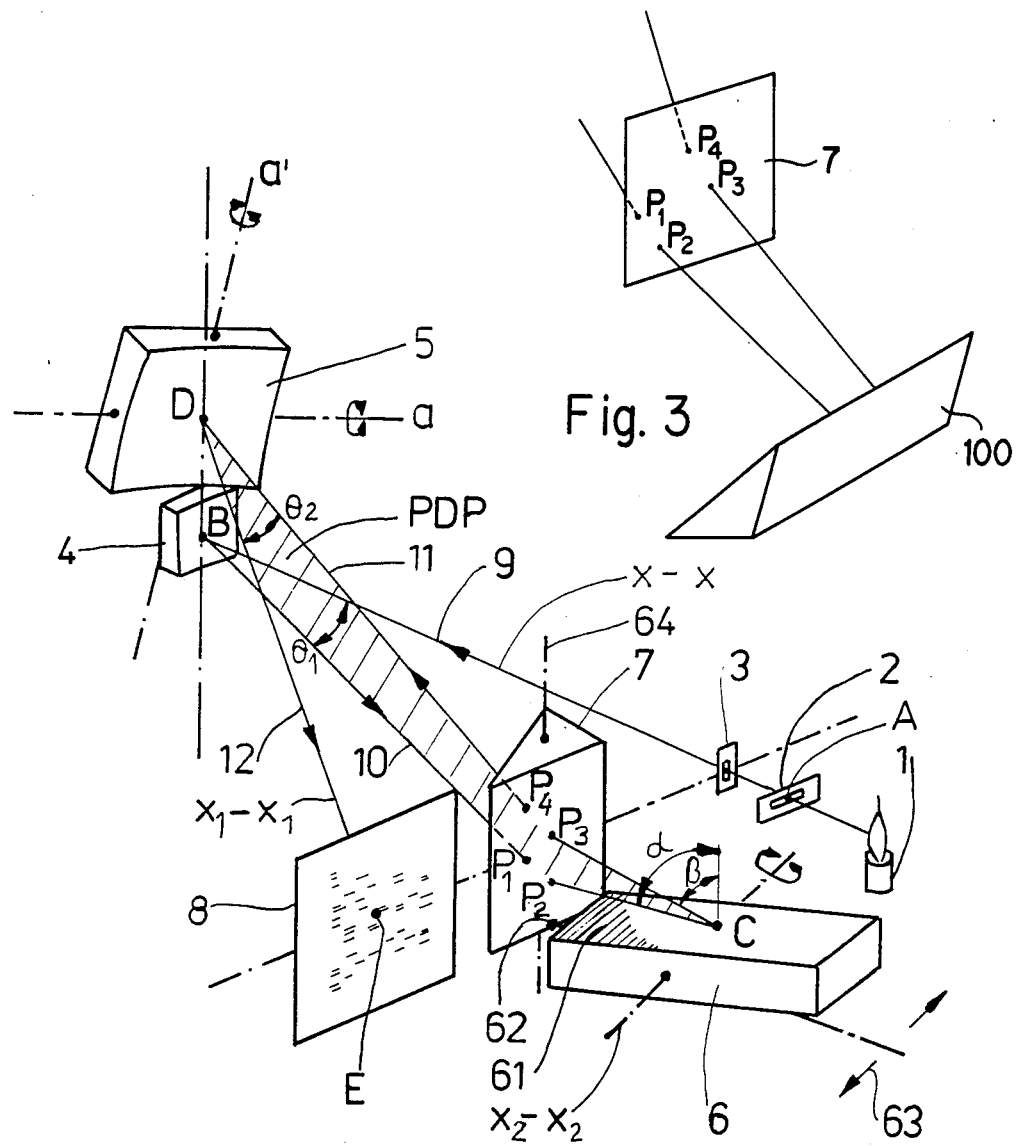

United States Patent [19]

Florek et al.

[11] Patent Number: 4,690,559

[45] Date of Patent: Sep. 1, 1987

[54] OPTICAL SYSTEM FOR SPECTRAL ANALYSIS DEVICES

[75] Inventors: Stefan Florek; Helmut Becker-Ross, both of Berlin; Hans-Jürgen Dobschal, Jena; Joachim Mohr, both of Jena, all of German Democratic Rep.

[73] Assignee: Jenoptik Jena GmbH, Jena, German Democratic Rep.

[21] Appl. No.: 744,861

[22] Filed: Jun. 14, 1985

[30] Foreign Application Priority Data

Jul. 2, 1984 [DD] German Democratic Rep. ................................. 2647890
Aug. 20, 1984 [DD] German Democratic Rep. ................................. 2664168

[51] Int. Cl.⁴ ............................................. G01J 3/18
[52] U.S. Cl. .................................. 356/328; 356/332; 356/334
[58] Field of Search .............. 356/302, 303, 305, 326, 356/328, 331, 332, 334

[56] References Cited

U.S. PATENT DOCUMENTS 3,658,423 4/1972 Elliott ................................. 356/328
4,049,353 9/1977 Missio ................................ 356/326
4,068,954 1/1978 Da Silva ............................. 356/334

FOREIGN PATENT DOCUMENTS 0148254 5/1981 German Democratic Rep. ................................. 356/305

OTHER PUBLICATIONS

Salmon et al., *Anal. Chem.*, v. 50, No. 12, Oct. 1978, p. 1714.
Bausch & Lomb Echelle Spectrograph brochure, Aug. 19, 1955.

*Primary Examiner*—F. L. Evans
*Attorney, Agent, or Firm*—Jordan and Hamburg

[57] ABSTRACT

The invention relates to an optical system for spectral analysis devices particularly for use in atomic emission spectroscopy in which the aberrations, astigmatis and coma are compensated separately, comprising two concave spherical reflectors adjacently arranged and having their vertices equidistantly located relative to a center of a dispersing member. The latter has a dispersion plane at right angles to the dispersing structure of the dispersing member and to its surface, the vertices are located in said dispersion plane. The center beams originating from an excitation light source are reflected at the reflectors in reflection planes which are at right angles to the dispersion plane. The light entrance of the optical system comprises two slits the images of which coincide in a focal plane. The center of the focal plane and the light entrance have a same distance to the dispersion plane and are located on different sides of the latter.

16 Claims, 3 Drawing Figures

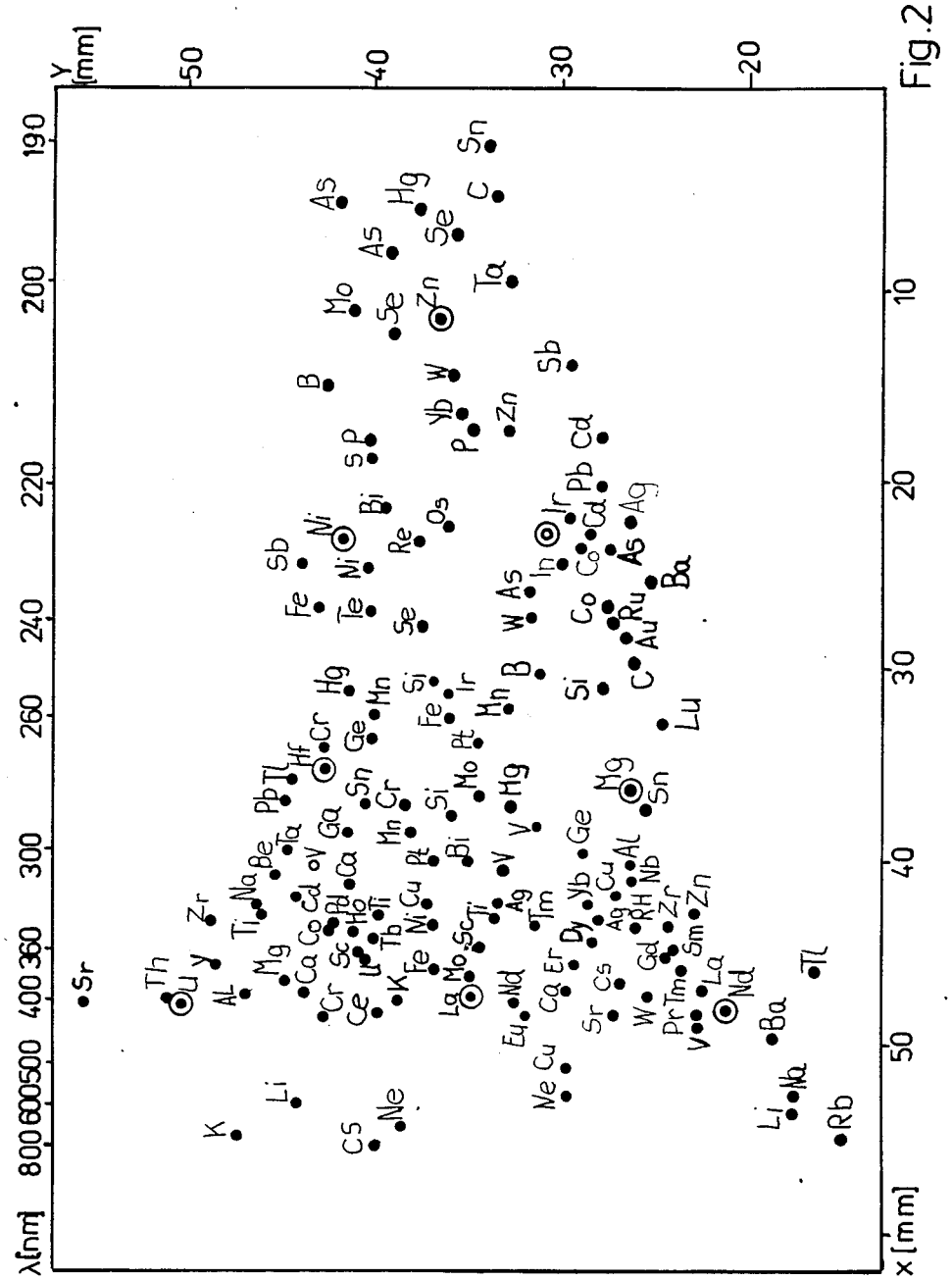

OPTICAL SYSTEM FOR SPECTRAL ANALYSIS DEVICES

The invention relates to an optical system for spectral devices particularly for use in the atom emission spectroscopy, both for polychromator operation and for monochromator operation. In the former a plurality of spectral lines are simultaneously evaluated and in the latter a continuous sequential registration of an entire spectrum of a sample material takes place.

Due to the analytical task the spectrometers very often have to satisfy the following conditions: an operation with a least feasible resolution, a least feasible light power to be transmitted, a considerably wide spectral range to be covered and a least feasible construction size of the spectrometer itself at the lowest feasible cost.

The required grating area is determined by the least feasible light power to be transmitted (light conductance value $\Delta$). Provided that the size of the grating is fixed, the smallest feasible off-axial angles cannot be maintained when the focal lengths of the collimator reflector and of the camera reflector are reduced so that the imaging aberrations increase. A least feasible construction size requires, in turn, a spectrometer set-up which is substantially corrected for aberrations. When considered under these conditions the known optical arrangements do not offer suitable conditions for the correction of the imaging aberrations, in particular, for coma and astigmatism.

The U.S. Pat. No. 4,183,668 discloses a method for correcting astigmatism in which the grating is illuminated by diverging radiation obtained through a displacement of the entrance slit. This solution is disadvantageous since the conditions for compensation of coma in Czerny-Turner-arrangements according to Reader (JOSA 9 (1969) 1189) are infringed. Astigmatism and coma may not be compensated individually, that is, independently from one another. The compensation of these aberrations involves distances between the components used and such angles which render the resulting apparatus bulky and make them expensive. In order to solve definite and frequently occuring spectrometrical tasks, spectral devices are required which can perform a simultaneous analysis as well as a continuous registration. The simultaneous analysis permits a significant reduction of the measuring time and of the amount of sample material particularly in the analytical routine operation. The continuous sequential registration mode permits the investigation of any individual spectral elements or a review of an entire radiation spectrum or parts thereof independent of the simultaneous operation channels selected. Echelle spectrometers are particularly suitable optical systems for realizing these objects since the entire measuring light of an extended spectral range is diffracted with a comparatively high effectivity and resolution at the echelle grating within a narrow angular range. In monochromator arrangements only one path of beams is sufficiently corrected for aberrations so that a simultaneous measurement of a plurality of spectral lines is not feasible within an extended spectrum range. Polychromators, for example, concave grating arrangements after Paschen-Runge are not applicable for an additional monochromator performance due to the wide spectral range which they produce. When both measuring procedures are required either two individual spectrometers have to be employed or essential features of a spectrometer have to be changed.

The latter is the case with an echelle-spectrometer of the Beckman comp., "Spectrospan V" which uses an echelle grating and a prism in a mutually crossed position. At the output of the spectrometer the entire spectrum produced from a sample material is presented in a flat-spread arrangement. An exchangeable cassette system which is located between the spectrometer and the photomultiplier housing permits a simultaneous and sequential analysis of a sample. When the device operates as a polychromator and simultaneously analyzes a sample material the radiation spectrum of the sample is produced in the focal plane, the cassette arranged therebehind is provided with exit slits in its front face at the respective locations of the emission lines. In its interior the cassette contains deviation optical systems associated with the respective exit slits which systems direct the light to the associated photomultipliers, which are non-displaceably arranged. A special cassette is provided for a monochromator operation having a variable exit slit in the center of the front face. By tilting the grating/prism combination any desired analysis line can be set to the exit slit by means of a drive system. Subsequent to the exit slit a photomultiplier is arranged. An essential and disadvantageous variation in said spectrometer is, apart from the required movements of two optical members, the exchange of the cassettes when the operation kind is changed from polychromator to monochromator mode, and vice versa. Furthermore, the cassettes have to be changed when the analysis program is changed in the polychromator operation mode. The aforesaid measures render the spectrometer expensive.

It is an object of the present invention to obviate the above disadvantages.

It is a further object of the present invention to provide an optical system in a spectral device which permits correction of aberrations, in particular astigmatism and coma independently from one another.

It is still a further object of the present invention to obtain a best feasible correction of the aberrations with a compact arrangement which can be employed both in a simultaneous operation mode and a continuous sequential operation mode without subjecting the optical arrangement to essential changes. In accordance with the present invention, there is provided an optical system for spectral devices which comprises a light entrance opening, a collimating optical member, a dispersing member, a camera optic, a focal plane and, in the latter, members for selecting spectral elements and transmitting the same to a detector arrangement. According to the invention the collimating optical member and the camera optic are spherical concave reflectors which have vertices equidistant to the dispersing member and arranged in the dispersion plane of the dispersing member. Central beams which are reflected at the collimating optical member and at the camera optic, propagate in reflection planes which are at right angles to the dispersing plane of the dispersion member. The light entrance opening is composed of two slits which are substantially at right angles to the light path in which they are subsequently arranged to effect a sagittal and meridional limitation of the entrance aperture. The images of the sagittal and meridional slit coincide in the focal plane.

The entrance aperture and the center of the focal plane are arranged at equal distances to the dispersion plane of the dispersion optical member, however, on opposite sides.

The tangentially limiting slit has a distance of $$r_t = \tfrac{1}{2} R \cos \theta \qquad (1)$$

relative to the collimating reflector.

The sagittally limiting slit has a distance to the collimating reflector of $$r_s = \tfrac{1}{2} R \cdot \cos \theta \frac{(\cos \alpha / \cos \beta)^2}{(\cos \alpha / \cos \beta)^2 \cdot \cos^2 \theta \sin^2 \theta} \qquad (2)$$

where R is the radius of the collimating reflector and of the camera reflector, respectively, $\theta$ is the angle included by the incident and the reflected center beam, $\alpha$ = the angle of incidence and $\beta$ = the dispersion angle at the dispersion optical member.

By virtue of the arrangement of the optical members stated hereinbefore the anamorphous magnification of the dispersion member occurs at right angles to the planes in which the center beams are deflected at the reflectors. When the entrance slit is located in the tangential focal point of the collimator reflector, that is, at a distance $r_t = \tfrac{1}{2} R \cdot \cos \theta$ a compensation of the coma is obtained. The coma aberration does not any longer depend on the angle of incidence $\alpha$ and the diffraction grating $\beta$ at the grating when a diffraction grating is used as a dispersing member.

Astigmatism is eliminated when the tangential image and the sagittal image of the entrance slit coincide in the focal plane. To obtain this the entrance slit is decomposed into two partial slits: the partial slit which limits the incident bundle of light beams at right angles to the direction of dispersion is located in the tangential focus of the collimator reflector for the compensation to be effected. The focussed image is then produced in the tangential focus of the camera reflector ($r_t = \tfrac{1}{2} R \cdot \cos \theta$).

In order to produce the sagittal image at the same location the other partial slit which limits the incident bundle of light in dispersion direction is displaced along the optical axis. The corresponding distance is given by $r_s$.

Under these conditions an image is produced in the focal plane which is corrected for coma and astigmatism. This permits minimizing the off-axial angles at the reflectors as well as the difference angle between the angle of incidence $\alpha$ and the diffraction angle $\beta$ at the grating as far as the minimal constructional size of the components will alow. Thus a compact arrangement of lowest space requirements will be obtained for which the aberrations coma and astigmatism are corrected in one point on the focal plane independently from one another.

The arrangement of the components according to the invention can suitably be used for echelle gratings, plane gratings or dispersion prisms, as well as for echelle gratings and dispersion prisms in a crossing setup. In the latter case the dispersion prism is preferably arranged adjacent the echelle grating in the path of beams which doubly passes the former.

In order to cope with an operation in polychromator or monochromator mode with a crossed setup of the prism and the echelle grating the camera reflector is seated for rotation about two axes which are at right angles to its optical axis. The detection means for selecting and transmitting of spectral elements which are intended for the polychromator operation mode and which are geometrically substantially uniformly distributed over the focal plane are at least partially (as concerns their number) employed for the monochromator operation mode. The particular imaging properties of the optical arrangement disclosed hereinbefore permit a displacement of the spectrum in the focal plane by slight rotation of the camera reflector at a neglectable reduction of the imaging quality of the entire arrangement. By a definite rotation about the two axes any spectral element out of an entire spectrum can be imaged upon the entrance face of a light transmitting means, for example, a light cable. The entrance face is located at a narrow distance in and to the focal plane.

By selection of a minimal number of light conductive members which are adapted for the polychromator operation mode and which are substantially equally distributed over the entire face of the focal plane for detecting respective spectral elements, the entire spectrum can be continuously registered by the detector arrangement involved in that the camera reflector can be definedly rotated within the angular range admitted for ensuring the required resolution. The number of sequence channels in the monochromator operation mode should advantageously be equal to the number of simultaneous channels in the spectrometer for the polychromator operation mode. In certain cases of application it is also feasible to employ all simultaneous channels for the monochromator mode of operation so to necessitate only minute displacements of the camera reflector. The association of the light conductive members to the individual detectors can be selected by choice and is controlled by a computer. Apart from a respective rotation of the camera reflector in the monochromator mode of operation such a rotation in the polychromator mode of operation permits a registration of neighboring spectral intervals for all spectral elements measured, as well as readjustment of the spectrum in the focal plane which have become necessary due to environmental influences.

It is also feasible to operate in the monochromator mode in that at least portions of the dispersing member are adjustable and the focal plane has an exit slit substantially in its center.

When an echelle grating is employed, this is seated about an axis in parallel to the grating grooves. This is also true when a plane grating is used as a dispersing member.

Provided that a dispersion prism for order separation is required in addition to the echelle grating a tilting about a tilting axis apart from the rotational movement becomes necessary about an axis which is at right angles to the rotation axis and which lies in the dispersion plane of the echelle grating. In the case of a dispersion prism the axis of rotation of the latter is at right angles to the dispersion plane of the dispersion prism.

In order that the invention may be more readily understood reference is made to the accompanying drawings which illustrate diagrammatically and by way of example one embodiment thereof and wherein FIG. 1 is a schematic view of an optical arrangement of a spectral device, FIG. 2 a schematic view of a detail of FIG. 1, namely, of a detection member in the focal plane; and FIG. 3 illustrates a portion of a modification of the arrangement of FIG. 1.

In FIG. 1 an optical arrangement for a spectral device is constituted of a light source 1 which is, for example, an excitation source for exciting a sample material to be analysed, as disclosed in the U.S. Pat. No.

4,328,614, a horizontal slit 2 and a vertical slit 3 which are subsequently arranged in a light beam 9 originating from the light source 1 and a collimating concave spherical reflector 4 having a radius of curvature $R_1$ and a vertex B. The beam of light 9 which defines an optical axis x—x is directed upon the reflecting concave face of the reflector 4, the object side focal point of which lies at least in the vicinity of the vertical slit 3 and the horizontal slit 2 both representing the entrance aperture for the device and serve to effect a tangential and sagittal, respectively, limitation of the aperture. A camera reflector 5 which is also a concave spherical reflector has a vertex D and a radius of curvature $R_2$. The camera reflector 5 and the collimating reflector 4 are adjacently arranged at a narrow distance and are both equidistantly positioned to an echelle grating 6, the surface of which has a center C. More precisely, the vertices B and D, which lie on a common line indicated by a dashpoint line, have an equal distance to the center C. The surface is provided with an effective structure of definite orientation.

According to the present invention the radii of curvature satisfy the condition $R_1 = R_2 = R$.

The reflector 5 is rotatably seated in axes a, a' which are at right angles to one another and to its optical axis (not shown) of the reflector 5. The axes a and a' are each connected via gear means (not shown) to step-motors (not shown) the operation of which is controlled by computer means (not shown). A dispersion prism 7 is arranged in the path of beam between the collimator reflector 4 and the camera reflector 5, on the one hand, and the grating 6, on the other hand, adjacent to the latter.

The optical axis x—x, after a first folding at the reflector 4 defines a first point of impinging on the one lateral face of the prism 7 $P_1$, a first point of exit $P_2$ and, after return passage from the grating 6, a second point of impinging $P_3$ upon the other lateral face of the prism 7 and a second point of exit $P_4$. The paths $\overline{P_1B}$ and $\overline{P_4D}$ define a principal dispersion plane which is at right angles to the direction of the grooves 61 of the grating 6. The dispersion prism 7 folds the principal dispersion plane PDP which is defined between the grating 6 and the dispersion prism 7 by the paths $\overline{P_2C}$ and $\overline{P_3C}$.

The optical axis x—x is again folded which takes place at the camera reflector 5 in the vertex D, this folded portion is designated $x_1$—$x_1$, about which, substantially in the image focal plane of the optical system a focal plane 8 is located which provides for a plurality of exit slits (not designated). The focal plane 8 has a center E which is remote from the principal dispersion plane PDP at an equal distance as the center A of the entrance slit 2 to the dispersion plane PDP, however, considered from the other side thereof. In operation, the light source 1 emits along the axis x—x a bundle of beams 9 which passes the entrance slit 2 which has the task to correct for sagittal aberrations and subsequently the entrance slit 3 which corrects for meridional or tangential aberrations. This is feasible since the slit 3 satisfies the condition $r_t = \frac{1}{2} R \cos \theta$, that is, the slit 3 is located at a distance $r_t$ from the collimator reflector 4. The slit 2 is distant from the collimator reflector 4 by $$r_s = \tfrac{1}{2} R \cos \theta \left[ \frac{\cos\alpha/\cos\beta^2}{(\cos\alpha/\cos\beta)^2 \cdot \cos^2\theta - \sin^2\theta} \right].$$

The beam 9 impinges upon the collimating reflector 4 where it is reflected at B and propagates as a beam 10 to the dispersion prism 7. The beams 9 and 10 include an angle $\theta_1$. The beam 10 impinges upon the one lateral face of the prism 7 at $P_1$ and leaves the prism 7 at $P_2$ to impinge upon the grating at C under an angle of incidence $\alpha$. The beam is subject to dispersion at the grating 6 and returns as a diffracted beam 11 at an angle $\beta$ which is the diffraction angle, to the prism 7, and passes the latter at $P_3$ and $P_4$. The beam 10 when passing the prism 7 is already subject to a dispersion which substantially takes place at right angles to the principal dispersion plane PDP, however, only the center beams (9,10,11,12) are shown in the drawing for the sake of simplicity. In other words the light transmitted by the beam 11 is spectrally decomposed in two dimensions so that an areal image as described hereinbelow results in the focal plane 8. The beam 11 is reflected at the vertex D of the camera reflector 5 and the reflected beam is designated with the numeral 12. The beams 11 and 12 include an angle $\theta_2$ which is equal to $\theta_1$. The reflected beam 12 impinges upon the focal plane 8 where it produces a spectrum which is spread in two dimensions.

An arrangement according to the present example has the following parameters:
$R_1 = R_2 = 1002$ mm
$\overline{AB} = 506.25$ mm
$\overline{BP_1} = \overline{DP_4} = 473$ mm
$\overline{CP_2} = \overline{CP_3} = 67$ mm $\theta_1 = \theta_2 = 7.46°$
$\alpha = 68.23°$
$\beta = 60.33°$.

The beams 9 and 10, and 11 and 12 define reflection planes (not designated) which are at right angles to the principal dispersion plane PCD.

The focal plane 8 is evaluated as follows: in a narrow space to the focal plane 8 and substantially parallel to the latter a slit mask (not shown) containing as many slits as there are spectral informations to be evaluated is positioned which, in turn, is followed by a plug-in unit with light conducting elements which transmit the spectral informations to photodetectors. These components are not shown for the sake of simplicity but are disclosed in more detail in the U.S. patent application Ser. No. 680,220. The arrangement of entry faces of light conducting members is shown in FIG. 2 which shows a front view of the plug-in unit. The spots represent the principal analysis lines of diverse elements as produced by the echelle grating 6 and the prism 7 in FIG. 1 and are designated by the corresponding name of the chemical element.

When the arrangement according to the invention operates in the monochromator mode light conductive members are selected from the entire number of polychromator channels and are associated to the detectors (not shown).

It is an advantage when the selected light conductive members are uniformly distributed over the spectrum.

The number of light conductive members selected is limited by the number of detectors provided. The registration of the entire number of spectral elements of an entire spectrum can be carried out by the nearest located monochromator channel by rotating the camera reflector 5 about the axes a and/or a'. For example, in FIG. 2 the mercury line Hg 194.227 nm is registered via the Zn-channel Zn 202.551 nm. Such a measurement does not involve a deterioration of the imaging quality.

In contrast thereto a registration if performed via the monochromator channel magnesium Mg 279,553 nm would involve a significant increase of the half width of the line due to aberrations. In order to associate the light conductive members to the photodetector displacement means are provided which are controlled by computer means as disclosed in the U.S. patent application Ser. No. 680,220.

The invention is not restricted to the above embodiment. Thus, instead of the dispersing grating 6 which is an echelle grating a plane grating can be employed. It is, however, also feasible to use a dispersion prism 100 instead of the grating 6 at the place of the latter, as seen in FIG. 3. The distribution of the spectral lines in the focal plane 8 cannot only be achieved by the displacements of the camera reflector 5. The latter may be arranged non-displaceably and the grating 6 is slightly rotated about an axis $x_2$—$x_2$, which is in parallel to the grating grooves 61, by respective means. In addition thereto, a tilting of the grating 6 in its plane about a pivot 62 is feasible in directions indicated by a double arrow 63.

Furthermore, it is feasible to slightly rotate the prism 7 about a perpendicular axis 64.

We claim:

1. An optical system for spectral analysis devices comprising a dispersion member having a surface provided with a dispersing structure and a dispersion plane at right angles to said surface and to a principal direction of said dispersing structure, a concave collimating reflector having a first vertex and a first radius of curvature R, a concave camera reflector having a second vertex and a second radius of curvature R, said collimating reflector and said camera reflector being adjacently arranged remote and at the same distance from said dispersion member, said first and said second vertex being located in said dispersion plane, said first radius of curvature R and said second radius of curvature R being equal, an excitation light source for emitting a light beam along a first optical axis, said light source being arranged in the vicinity of said dispersion member on one side of said dispersion plane, said first optical axis connecting said light source and said first vertex, said collimating reflector being for producing a reflected beam from said light beam and directing the same to said dispersion member, said reflected beam and said light beam including a first angle $\theta$ and defining a first reflection plane, an aperture being arranged about said first optical axis adjacent said light source, said aperture comprising a horizontal slit and a vertical slit, said horizontal slit having a first distance $r_s$ to said collimating reflector, said vertical slit having a second distance $r_t$ to said collimating reflector, a focal plane on the side of said dispersion plane opposite said first side in the vicinity of said dispersion member, said focal plane having a center, said center and said aperture being substantially equidistantly positioned to said dispersion plane, a second optical axis connecting said center of said focal plane and said second vertex, said dispersion member being for producing a dispersed beam from said reflected beam and directing the dispersed beam to said camera reflector, said second optical axis and said dispersed beam including a second angle $\theta$ and defining a second reflection plane, said first and said second angle $\theta$ being equal, said first and said second reflection plane being substantially at right angles to said dispersion plane, said reflected beam, when impinging upon said dispersion member, producing a point of impingement, said reflected beam and a perpendicular line erected on said surface of said dispersion member at said point of impingement including an angle $\alpha$, said dispersed beam and said perpendicular line including an angle $\beta$.

2. An optical system as claimed in claim 1, wherein said vertical slit serves to tangentially limit said beam and said horizontal slit serves to sagittally limit said beam, and wherein said first distance $$r_s = \tfrac{1}{2}R \cdot \cos\theta \left[ \frac{(\cos\alpha/\cos\beta)^2}{(\cos\alpha/\cos\beta)^2 \cdot \cos^2\theta - \sin^2\theta} \right]$$

and said second distance $$r_t = \tfrac{1}{2}R \cos\theta.$$

3. An optical system as claimed in claim 2, wherein the dispersion member is an echelle grating.

4. An optical system as claimed in claim 3, wherein a first dispersion prism is inserted into the reflected beam and the dispersed beam between said collimator reflector and camera reflector on the one hand and the dispersion member, on the other hand, and wherein the dispersion prism dispersion plane is substantially at right angles to said dispersion plane of said dispersion member.

5. An optical system as claimed in claim 2, wherein the dispersion member is a plane grating.

6. An optical system as claimed in claim 2, wherein said dispersion member is a dispersion prism.

7. An optical system as claimed in claim 3, wherein said camera reflector is seated for rotation about axes which are at right angles to one another and to the optical axis of the camera reflector.

8. An optical system as claimed in claim 7, wherein means for selecting and transmitting spectral elements are provided in the focal plane substantially uniformly distributed over the entire focal plane, and wherein the number of said means being intended for a polychromator operation mode is at least for a part applicable in a monochromator operation mode.

9. An optical system as claimed in claim 4, wherein said camera reflector is seated for rotation about axes which are at right angles to one another and to the optical axis of the camera reflector.

10. An optical system as claimed in claim 9, wherein means for selecting and transmitting spectral elements are provided in the focal plane substantially uniformly distributed over the entire focal plane, and wherein the number of said means being intended for a polychromator operation mode is at least for a part applicable in a monochromator operation mode.

11. An optical system as claimed in claim 2, wherein the dispersion member is displaceable relative to the impinging reflected beam for a monochromator operation mode and wherein an exit slit is provided substantially in said center of said focal plane.

12. An optical system as claimed in claim 3, wherein said dispersion member is rotatable about an axis which is substantially parallel to the principle direction of said dispersing structure.

13. An optical system as claimed in claim 11, wherein said dispersion member is rotatable about an axis which is substantially parallel to the principle direction of said dispersing structure.

14. An optical system as claimed in claim 4, wherein said echelle grating is rotatable about an axis in parallel to said principle direction of said dispersing structure and a pivot is provided at right angles to said surface for pivoting said echelle grating in a plane defined by said surface.

15. An optical system as claimed in claim 5, wherein said plane grating is provided with an axis of rotation substantially in parallel to said principle structure for rotating said plane grating.

16. An optical system as claimed in claim 6, wherein said dispersion prism is rotatable about an axis at right angles to the dispersion plane of the dispersion prism.

* * * * *

UNITED STATES PATENT AND TRADEMARK OFFICE
CERTIFICATE OF CORRECTION

PATENT NO. : 4,690,559

DATED : September 1, 1987

INVENTOR(S) : Stefan Florek et al

It is certified that error appears in the above-identified patent and that said Letters Patent are hereby corrected as shown below:

Column 3, equation (2), a minus sign should be inserted between "$\cos^2\Theta$ and "$\sin^2\Theta$".

Signed and Sealed this

Seventeenth Day of May, 1988

Attest:

DONALD J. QUIGG

*Attesting Officer*

*Commissioner of Patents and Trademarks*

UNITED STATES PATENT AND TRADEMARK OFFICE
CERTIFICATE OF CORRECTION

PATENT NO. : 4,690,559
DATED : September 1, 1987
INVENTOR(S) : Stefan Florek et al It is certified that error appears in the above–identified patent and that said Letters Patent are hereby corrected as shown below:

Column 1, lines 14 and 18, all three occurrences of "least" should read -- greatest --.

Signed and Sealed this

Fifth Day of July, 1988

Attest:

DONALD J. QUIGG

*Attesting Officer*   *Commissioner of Patents and Trademarks*